Aug. 5, 1958
K. E. DRAEGER ET AL
2,846,366
FLUID HYDROFORMING PROCESS
Filed Dec. 19, 1955
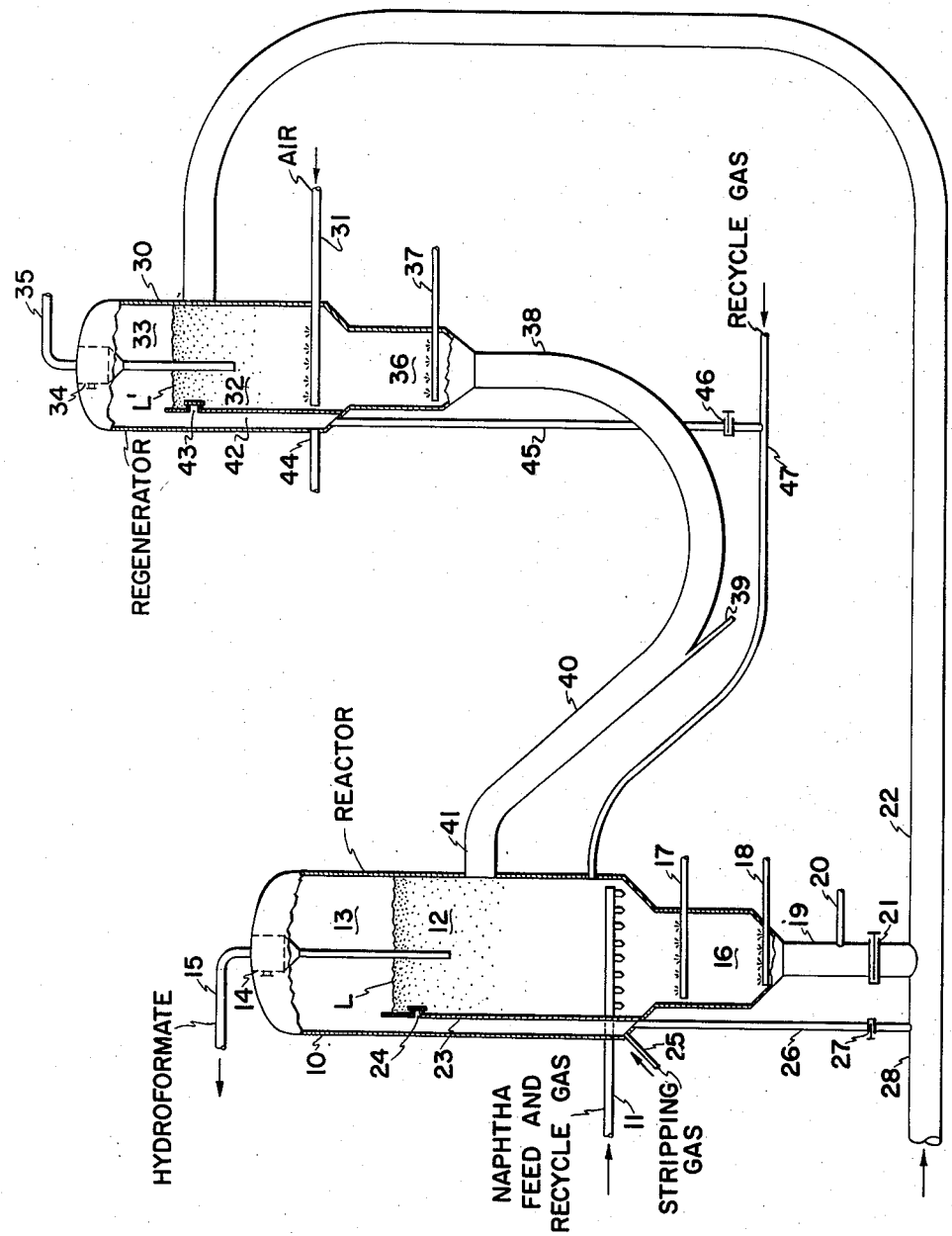
Kenneth E. Draeger
James F. Ross
Inventors
By H. M. Feyrer Attorney

United States Patent Office 2,846,366
Patented Aug. 5, 1958

2,846,366

FLUID HYDROFORMING PROCESS

Kenneth Earl Draeger and James Francis Ross, Baton Rouge, La., assignors to Esso Research and Engineering Company, a corporation of Delaware Application December 19, 1955, Serial No. 553,825

4 Claims. (Cl. 196—50)

This invention pertains to fluid catalytic processes in which inert heat transfer solids or shot are circulated in the system in order to facilitate removal of heat from an exothermic reaction zone and/or to supply heat to an endothermic reaction zone. Specifically this invention involves a heat-balanced fluid hydroforming process in which catalyst is circulated continuously between a fluidized bed in the reaction zone and a similar fluidized bed in the regeneration zone and inert heat transfer solids are also circulated between the same two fluidized beds but at a substantially faster rate than the catalyst.

The fluidized solids technique has been widely used for a variety of non-catalytic and catalytic processes especially for the conversion of hydrocarbons as in catalytic cracking, reforming, hydroforming and the like because of the advantages offered thereby of continuity of operation, uniformity of temperatures in the reaction as well as the regeneration zones and the facility with which control of all phases of the process is achieved. An important advantage of the fluidized solids technique is the fact that the catalyst can be used as a carrier of heat from the regeneration zone into the reaction zone.

It has been proposed to increase heat transfer in fluidized solids catalytic processes by circulating inert heat transfer solids or shot through the system along with the finely divided catalyst. This expedient is especially useful in fluid hydroforming processes using a group VI metal oxide such as molybdic oxide on alumina as the catalyst since selectivity considerations require that low catalyst-to-oil ratios, generally less than 3.5 to 1 and preferably about 1 to 1 be used. Such low catalyst to oil ratios limit the amount of heat that can be safely transferred from the regeneration zone to the reaction zone as sensible heat in the catalyst. Since the amount of heat released in the regenerator is greater than the catalyst can transfer to the reactor at permissible temperatures, it is common practice to arrange cooling coils in the regenerator. This, of course, precludes the achievement of a heat-balanced operation. This, in turn, makes it necessary to preheat the naphtha feed and the recycle gas to such high temperatures as tend to cause thermal degradation of the naphtha as well as of the higher molecular weight constituents of the recycle gas. By circulating inert heat transfer solids in the system along with or in addition to the catalyst, it is possible to eliminate the cooling coils in the regenerator, lower the preheat temperatures of the feed and recycle gas and also reduce the amount of recycle gas circulated and still achieve a heat balanced operation.

In order for the addition of heat transfer solids or shot to fluid hydroforming reaction systems to be at all practical, it is necessary to minimize the portion of the available reactor space that is occupied by the shot. It is inadvisable, for example, for the shot to occupy more than about 10% of the reactor bed (i. e. about 1 to 10 shot to catalyst ratio) because larger proportions of shot would reduce unduly the capacity or throughput of the reactor. This is particularly important in fluid hydroforming because of the high costs of construction of reactor vessels capable of operating at normal hydroforming pressures of say about 200 lbs. per sq. inch. On the other hand, considerably more than 10% of shot is required to absorb the heat released in the regenerator. Minimum values for heat balanced operation are of the order of about 3 to 1 and may be as high as 8 or 10 to 1 shot to catalyst ratio. This is achieved by making the shot of a larger average particle size and/or of greater density than the catalyst so that it may settle rapidly through the dense fluidized reactor and/or regenerator bed and be segregated or concentrated and circulated to the other vessel at a substantially faster rate than the catalyst.

The object of this invention is to provide the art with an improved method for hydroforming of naphtha or motor gasoline fractions by the fluidized solids technique employing inert heat transfer solids or shot to improve heat transfer.

It is also the object of this invention to provide a fluid hydroforming process employing group VI metal oxide catalysts along with shot for improving heat transfer between the regeneration and the reaction zones in which the catalyst and shot are supplied to the reactor separately.

It is a further object of this invention to provide means for overcoming high carbon production caused by the catalyst fines which adhere to the shot particles by treating these adhering catalyst fines after regeneration with hydrogen so as to reduce their carbon forming tendencies.

These and other objects will appear more clearly from the detailed description and claims which follow.

In accordance with the present invention inert, heat transfer solids or shot such as mullite, fused alumina, fused silica or the like or metal particles such as stainless steel or Monel are circulated between the regeneration and reaction zones in order to assist in the transfer of heat between said zones. Because of the fact that the shot particles have larger average diameters and are usually of higher average density than the catalyst they tend to settle through the dense fluidized beds in the reactor and regenerator vessels. This tendency of the shot particles to settle through the dense fluidized beds is promoted by limiting or controlling the vapor or gas velocities through the bed. Moreover, by swaging down the bottoms of the vessels containing such fluidized beds to form an appendage or settling zone of reduced cross sectional area as compared with the main vessel and introducing gas at controlled velocity into the lower portion of the settling zone it is possible to withdraw a solids stream from this settling zone consisting essentially of pure shot. Provision is also made for withdrawing catalyst from the vessel as by arranging a catalyst withdrawal well or line with its inlet near the upper part of the dense fluidized bed so that a stream consisting essentially of catalyst free from shot may be withdrawn. By controlling the rate at which shot and catalyst are withdrawn from the reactor it is possible to remix shot and catalyst in any desired ratio for circulation to the regenerator.

In accordance with the present invention shot is segregated in the regenerator as well as the reactor but the regenerated catalyst and the heated shot are recycled separately to the reactor. By so doing it is possible to discharge the shot at or near the top of the reactor dense bed thereby maximizing the length of bed traversed by the shot and insuring complete transfer of heat from the shot to the reactor dense bed. More importantly, it is also possible to discharge the regenerated catalyst into the reactor dense bed at a substantially lower level thereby avoiding appreciable product distribution debits which are incurred when hot, regenerated, unpretreated group VI metal oxide hydroforming catalyst particles are introduced into a zone of hydroformate product vapors.

It has been found that when circulating shot in such systems that appreciable quantities of catalyst fines become attached to the surface of the shot and are transported with the shot. The shot particles pass through the reactor dense bed very quickly and therefore these catalyst fines on the surface of the shot do not contribute, to any great extent to the normal hydroforming reaction. These catalyst fines adhering to the shot, however, do form appreciable amounts of carbon. It has been found that the carbon production by the catalyst fines adhering to the shot can be reduced very appreciably by pretreating the heated shot from the regenerator with a hydrogen-rich reducing gas prior to discharging said shot back into the reactor vessel.

Reference is made to the accompanying drawing which illustrates, diagrammatically, one embodiment of the present invention.

In the drawing, the hydroforming reactor vessel 10 is charged with a mixture of finely divided, group VI metal oxide hydroforming catalyst and inert heat transfer solids or shot. Recycle gas and preheated naphtha feed are supplied to the lower part of the reactor vessel through suitable inlet and distributor means 11. While a common inlet line for naphtha and recycle gas is shown, it will be understood that the naphtha and recycle gas can also be introduced separately and through such means as nozzles, rings, spiders, etc. in order to obtain uniform distribution of the recycle gas and naphtha feed in the reactor. Vapor or gas velocities through the reactor are controlled to form a dense, fluidized bed 12 having a definite level L or interface separating it from a dilute or disperse phase 13 comprising small amounts of catalyst or solids entrained in the vaporous reaction products in the upper part of the reactor vessel. The reaction products pass overhead from the reactor vessel 10 through a cyclone separator 14 or the like for separating entrained catalyst and recycling the same to the reactor dense bed 12 through the dipleg attached to the separator. Reaction products substantially free from catalyst or other solid particles are removed through hydroformate product outlet line 15 to suitable product recovery, stabilizing and/or storage equipment.

Suitable catalyst for charging to the system are group VI metal oxides such as molybdenum oxide, chromium oxide and the like upon a support. Preferred catalysts are those containing from about 3 to 15 wt. percent of molybdenum oxide upon an activated alumina support which may contain small, stabilizing amounts of about 1 to 6 wt. percent silica. The catalyst particles should, for proper fluidization be between 100 and 400 mesh or between 10 and 200 microns in diameter with a major proportion between about 20 and 100 microns.

The inert heat transfer solids or shot are preferably coarser and/or of greater density than the catalyst. Suitable materials include particles of metal such as stainless steel or Monel, corundum, mullite, fused alumina, fused silica or the like.

It is necessary that the heat transfer solids have no adverse effects upon the hydroforming process and that they be stable or resistant to physical breakdown due to thermal and mechanical forces to which they are subjected in the process.

The size of the heat transfer solids or shot may vary from about 200 to 2000 microns and they are preferably in the shape of spherical or speroidal particles and about 500 to 1000 microns in diameter.

Because of the fact that the shot particles are larger and generally are of greater density than the catalyst particles, they settle more rapidly than the catalyst to the bottom of reactor section 10 and thence into the settling or concentrating section 16. Recycle gas is supplied to settling zone 16 as through inlet lines and distributors 17 and 18 and serves to strip out and entrain catalyst that may be carried down into section 16 by the shot and to carry such entrained catalyst back into the reactor dense bed. Shot substantially free from catalyst settles to the bottom of zone 16 and thence into standpipe 19 where it is contacted, if desired with additional stripping gas supplied through inlet line 20. The stripped shot is discharged from the standpipe 19 at a rate controlled by slide valve 21 or other suitable control means into transfer line 22.

Catalyst is withdrawn separately from the dense bed 12 by arranging a withdrawal well 23 having its upper, open end above the dense bed level L and having an opening or inlet port 24 arranged near the upper part of dense bed 14. Stripping gas such as steam or an inert gas such as methane or nitrogen is supplied to the lower part of withdrawal well 23, as through inlet line 25, in order to strip out entrained or adsorbed vaporous reactants which are then discharged into the dilute or disperse phase 13 in the upper part of the reactor for recovery with the main body of reaction products. Stripped catalyst, essentially free of shot, passes downwardly from the withdrawal well into standpipe 26 and thence, at a rate controlled by slide valve or other suitable flow control means 27, into transfer line 22 where it is picked up by a stream of regeneration or suitable transport gas supplied through line 28, mixed with shot discharged from standpipe 19 and conveyed to regenerator vessel 30.

The slide valves 21 and 27 are set to discharge shot and catalyst into the transfer line 22 in the desired ratio (generally upwards of 3 to 1 shot to catalyst ratio) for circulation to the rengerator 30 where inactivating carbonaceous deposits are burned off, regenerating the catalyst particles and heating the catalyst and shot to regenerator temperatures. Additional air for regeneration is supplied through inlet line and distributor 31. The velocity of the air or regeneration gas through the regenerator vessel is at such a rate as to form a dense, fluidized bed 32 of catalyst and shot particles in regeneration gas and having a definite level or interface $L^1$. A dilute or disperse phase comprising small amounts of entrained solid particles in regeneration gases is formed at 33 in the upper part of regenerator 30 above the dense bed level $L^1$. The regeneration gases are withdrawn from the regenerator vessel 30 through a cyclone separator 34 or the like and the gases, substantially free of catalyst or solid particles, pass overhead through outlet line 35 to a turbine or suitable pressure relief means and to a waste gas stack or waste heat boiler or to suitable scrubbing and storage equipment if it is to be used in the process as stripping or transport gas.

The shot particles tend to settle through the dense bed 32 in regenerator 30 similarly to the way they settle through the dense bed 12 in reactor 10 and by controlling the velocity of the air through the dense bed the shot can be made to settle into the concentrating zone 36 at the bottom of the regenerator vessel 30. Additional air or stripping gas is introduced through inlet line 37 into the lower part of the concentrating zone in order to strip out any catalyst carried into his zone by the descending shot. Shot substantially free of individual catalyst particles but to which about 5 to 10 wt. percent of catalyst fines adhere due possibly to electrostatic forces or to mere physical pounding or abrasion of catalyst onto the surface of the shot is discharged from the bottom of settling or concentrating zone 36 into the downflow leg 38 of a U-bend transfer line. Lift gas is supplied through inlet line 39 to facilitate the flow of shot through the upflow leg 40 and thence through inlet line 41 into the reactor vessel 10. In accordance with this invention hydrogen or a hydrogen-rich gas is used as the lift gas in order that the small amount of catalytic metal oxide which is carried upon the shot may be partially reduced to minimize its carbon forming properties. For example, in the case of molybdenum oxide catalysts, in which the catalytic component is oxidized to $MoO_3$ in the regenerator vessel, the catalytic component adhering to the shot is reduced to $Mo_2O_5$ or $MoO_2$ or mixtures of these materials by the action of the hydrogen in the lift gas. It will be understood that the U-bend transfer line shown is merely illustrative and that other arrangements such as a standpipe and dilute phase riser or even a simple transfer line could be used for the transfer of the hot shot to the reactor and its pretreatment or contact with hydrogen-containing gas. If a simple, inclined transfer line is used it would be desirable to provide suitable traps or other means to prevent the hydrogen containing pretreat gas from getting into the regenerator vessel 30.

Catalyst is withdrawn separately from the regenerator vessel 30 by arranging a withdrawal well 42 having its upper, open end above the dense bed level $L^1$ and having an opening or inlet port 43 arranged near the upper part of dense bed 32. Stripping gas such as steam or scrubbed flue gas is supplied to the lower part of the withdrawal well for stripping off residual or entrained regeneration gas. The stripped, regenerated catalyst is discharged from the base of the withdrawal well 42 into standpipe 45 and thence through slide valve 46 or other suitable flow control means into transfer line 47 where it is picked up by a stream of hydrogen-rich recycle gas supplied through line 48 and conveyed back into the lower part of the reactor dense bed 12.

The feed or charging stock to the reactor in a hydroforming operation may be a virgin, cracked (thermal or catalytic) or Fischer-Tropsch naphtha, or the like or mixtures of two or more of these naphthas having a boiling range of from about 125–450° F., or it may be a narrow-boiling cut from within this range. The feed stock is preheated to about reaction temperature and supplied to the reaction zone. Recycle gas is preheated to temperatures of up to about 1200° F. and introduced or circulated through the reaction zone at rates of from about 500 to 6000 cu. ft. per barrel of naphtha feed.

The hydroforming reactor vessel is operated at about 850–1050° F. preferably about 900–950° F. and at pressures of about 50–1000, preferably about 200 lbs. per sq. inch. In the case of molybdenum oxide on alumina catalysts it is desirable to maintain a water partial pressure of about 0.1 to 3.0 mol percent in the reaction zone.

The regenerator is operated at essentially the same pressure as the hydroformer reactor vessel and at temperatures of about 1000–1200° F. or low enough to avoid thermal degradation of the catalyst. The average residence time of the catalyst in the reactor vessel is of the order of from about 1 to 4 hours and in the regenerator vessel of from about 3 to 60 minutes. The average residence time of the heat transfer solids in the reaction zone is of the order of about 3 to 20 minutes and in the regeneration zone the residence time of the heat transfer solids may be coextensive with that of the catalyst or said solids may be held for longer or shorter times than the catalyst.

The weight ratio of catalyst to oil introduced into the reactor should ordinarily be about 0.5 to 3.5. Space velocities, or the weight in pounds of feed charged per hour per pound of catalyst in the reactor depend upon the age and activity level of the catalyst, the character of the feed stock and desired octane number of the product. Space velocity for a molybdic oxide on alumina gel catalyst may vary from about 1.5 to about 0.15 w./hr./w.

The following example is illustrative of the present invention.

A Louisiana-Mississippi virgin naphtha of 202–335° F. boiling range is hydroformed in a fluidized solids reactor system charged with a catalyst consisting essentially of 10 wt. percent molybdic oxide on activated alumina. Mullite shot having an average diameter of about 500 microns is circulated in the system to facilitate the recovery of heat released in the regenerator and the transfer of such heat to the reaction zone. The reactor temperature was 900° F. and the system pressure was 200 lbs. per square inch. Recycle gas was charged to the reactor at a rate of 3000 s.c.f./b. or at a hydrogen to oil ratio of 3.0. The regenerator is operated at about 1150° F. and the catalyst to oil ratio is 1.0.

The following table summarizes a comparison of operations in which the shot, with adherent catalyst is recycled to the reactor without contact with hydrogen or reducing gas and with contact with hydrogen in accordance with the present invention.

Table

| | Pretreated Shot | Unpretreated Shot |
|---|---|---|
| Shot Circulation Rate (Lbs./lb. Naphtha) | 5.0 | 5.0 |
| Catalyst Fines on Shot (Wt. Percent) | 7.5 | 7.5 |
| Catalyst Fines on Shot (Lbs./lb. Naphtha) | 0.38 | 0.38 |
| Carbon formed on Catalyst Fines on Shot (Wt. Percent on Catalyst) | 0.07 | 0.75 |
| Carbon formed on Catalyst Fines on Shot (Wt. Percent on Feed) | 0.03 | 0.29 |

It may be readily seen from this data that pretreatment of the shot lowers carbon formation due to catalyst fines on the shot to an extremely low level. Without pretreatment, substantial quantities of carbon are formed, 0.29 wt. percent based on feed being almost 50% of the minimum carbon lay-down on the freely circulating catalyst. Since the fines adhering to the shot particles are relatively ineffective in the conversion it is obvious that severe penalties are suffered if the shot particles with adherent catalyst fines are recycled to the reaction zone without pretreatment.

The foregoing description contains a limited number of embodiments of this invention. It will be understood that this invention is not limited thereto since numerous variations are possible without departing from the scope of this invention.

What is claimed is:

1. In a method of hydroforming hydrocarbon fractions boiling within the motor fuel boiling range in contact with a major proportion of finely divided Group VI metal oxide catalyst particles and a minor proportion of inert heat transfer solids or shot in which catalyst particles and shot are continuously withdrawn from the reaction zone and circulated to a regeneration zone where carbonaceous deposits are burned off, the improvement which comprises controlling gas velocities through the regenerator dense bed so that shot particles settle to the bottom of the regenerator vessel and into a shot concentrating zone, passing a stream of gas through said concentrating zone to elutriate away any catalyst entrained into said zone by the descending catalyst, withdrawing hot shot particles from said zone carrying small quantities of catalyst fines strongly adhered to said shot, contacting the withdrawn shot with a hydrogen-containing gas in order to partially reduce the adherent catalyst fines, recycling the hydrogen treated shot particles to the upper part of the reactor dense bed, separately withdrawing a stream of catalyst particles substantially free from shot from the regenerator dense bed and recycling this stream of catalyst to the lower part of the reactor dense bed.

2. The method as defined in claim 1 in which the catalyst consists essentially of molybdenum oxide on alumina and the pretreatment of the regenerated shot particles serves to minimize carbon formation by the catalyst fines adhering to the shot.

3. The method as defined in claim 2 in which the shot is circulated between the reaction zone and the regeneration zone at a rate about five times that at which the catalyst is circulated between said zones.

4. The method as defined in claim 3 in which about 5 to 10 wt. percent of catalyst fines based upon the shot is adhered to the shot.

References Cited in the file of this patent

UNITED STATES PATENTS

| 2,325,136 | Kassel | July 27, 1943 |
| 2,446,247 | Scheineman | Aug. 3, 1948 |
| 2,721,167 | Nicholson | Oct. 18, 1955 |